(12) United States Patent
Grant et al.

(10) Patent No.: US 7,180,204 B2
(45) Date of Patent: Feb. 20, 2007

(54) METHOD AND APPARATUS FOR WIND TURBINE AIR GAP CONTROL

(75) Inventors: James Jonathan Grant, Niskayuna, NY (US); Bharat Sampathkumaran Bagepalli, Niskayuna, NY (US); Patrick Lee Jansen, Scotia, NY (US); Paul Stephen DiMascio, Greer, SC (US); Aniruddha Dattatraya Gadre, Rexford, NY (US); Ronghai Qu, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 33 days.

(21) Appl. No.: 11/031,259

(22) Filed: Jan. 7, 2005

(65) Prior Publication Data

US 2006/0152014 A1  Jul. 13, 2006

(51) Int. Cl.
*F03D 9/00* (2006.01)
(52) U.S. Cl. ...................................... 290/55
(58) Field of Classification Search ............... None
See application file for complete search history.

(56) References Cited

U.S. PATENT DOCUMENTS

| 5,140,856 A | 8/1992 | Larsen |
| 5,663,600 A | 9/1997 | Baek et al. |
| 6,452,287 B1 * | 9/2002 | Looker ................ 290/55 |
| 6,759,758 B2 * | 7/2004 | Torres Martinez ........... 290/55 |
| 2004/0232704 A1 * | 11/2004 | Casazza et al. ............... 290/55 |

FOREIGN PATENT DOCUMENTS

| DE | 4402184 C2 * | 11/1995 |
| DE | 19704652 C1 * | 7/1998 |
| DE | 10255745 A1 * | 6/2004 |
| EP | 1394406 A2 * | 3/2004 |
| WO | WO0121956 A1 * | 3/2001 |
| WO | WO 2004068678 A1 * | 8/2004 |

* cited by examiner

Primary Examiner—Joseph Waks
(74) Attorney, Agent, or Firm—James E. McGinness, Esq.; Armstrong Teasdale LLP

(57) ABSTRACT

Methods and apparatus for assembling a wind turbine generator are provided. The wind turbine generator includes a core and a plurality of stator windings circumferentially spaced about a generator longitudinal axis, a rotor rotatable about the generator longitudinal axis wherein the rotor includes a plurality of magnetic elements coupled to a radially outer periphery of the rotor such that an airgap is defined between the stator windings and the magnetic elements and the plurality of magnetic elements including a radially inner periphery having a first diameter. The wind turbine generator also includes a bearing including a first member in rotatable engagement with a radially inner second member, the first member including a radially outer periphery, a diameter of the radially outer periphery of the first member being substantially equal to the first diameter, the rotor coupled to the stator through the bearing such that a substantially uniform airgap is maintained.

32 Claims, 4 Drawing Sheets

METHOD AND APPARATUS FOR WIND TURBINE AIR GAP CONTROL

STATEMENT REGARDING FEDERALLY SPONSORED RESEARCH & DEVELOPMENT

The government of the United States of America has certain rights in this invention pursuant to NREL Subcontract No. NREL-ZAM-4-31235-05, Prime Contract No. DE-AC36-99GO10337 awarded by the U.S. Department of Energy.

BACKGROUND OF THE INVENTION

This invention relates generally to electric generators, and more particularly, to methods and apparatus for controlling an air gap between a rotor and a stator in a wind-powered turbine generator.

Recently, wind turbines have received increased attention as an environmentally safe and relatively inexpensive alternative energy source. With this growing interest, considerable efforts have been made to develop wind turbines that are reliable and efficient.

Generally, a wind turbine includes a plurality of blades coupled to a rotor through a hub. The rotor is mounted within a housing or nacelle, which is positioned on top of a tubular tower or base. Utility grade wind turbines (i.e., wind turbines designed to provide electrical power to a utility grid) can have large rotors (e.g., 30 or more meters in diameter). Blades on these rotors transform wind energy into a rotational torque or force that drives the rotor of one or more generators, rotationally coupled to the rotor. The rotor is supported by the tower through a bearing that includes a fixed portion coupled to a rotatable portion. The bearing is subject to a plurality of loads including a weight of the rotor, a moment load of the rotor that is cantilevered from the bearing, asymmetric loads, such as, horizontal wind shears, yaw misalignment, and natural turbulence In the generator, rotor components and stator components are separated by an airgap. During operation, a magnetic field generated by permanent magnets and/or wound magnets mounted on the rotor passes through the airgap between the rotor to the stator. The passage off the magnetic field through the airgap is at least partly dependent on the uniformity of the airgap. Asymmetric and/or transient loads on the rotor may be introduced through the blades. Such loads are channeled from the rotor to the wind turbine base through the bearing and may tend to deflect structural components of the rotor in the load path such that the airgap distance is reduced and/or made non-uniform. Wind turbine components may be fabricated to withstand such loads. However, the size and weight disadvantage of those components make their use economically prohibitive. Additionally, the substantial structure needed to control the airgap would use up valuable Hub-Access space needed to install and service systems such as Pitch-Control and other devices.

BRIEF DESCRIPTION OF THE INVENTION

In one embodiment, a method for assembling a wind turbine generator is provided. The method includes coupling a stator core to a stator such that the stator core extends axially from the stator, coupling one of a radially inner bearing member and a radially outer bearing member of a bearing to the stator, and coupling a rotor to the bearing, the rotor including a plurality of magnetic elements coupled to a radially outer periphery of the rotor such that an airgap is defined between the stator core and the magnetic elements, the plurality of magnetic elements comprising a radially inner periphery having a first diameter, a diameter of the radially outer periphery of the outer member being substantially equal to the first diameter, the rotor coupled to the stator through the bearing such that a substantially uniform airgap is maintained.

In another embodiment, a wind turbine generator is provided. The wind turbine generator including a stator having a core and a plurality of stator windings circumferentially spaced about a generator longitudinal axis, and a rotor rotatable about the generator longitudinal axis, wherein the rotor includes a plurality of magnetic elements coupled to a radially outer periphery of the rotor such that an airgap is defined between the stator windings and the magnetic elements. The plurality of magnetic elements include a radially inner periphery having a first diameter, and a bearing having a first member in rotatable engagement with a radially inner second member, the first member including a radially outer periphery wherein a diameter of the radially outer periphery of the first member is substantially equal to the first diameter, and the rotor is coupled to the stator through the bearing such that a substantially uniform airgap is maintained.

In yet another embodiment, a bearing for a wind turbine generator is provided. The wind turbine generator includes a rotor having a plurality of magnetic elements circumferentially spaced about the rotor, the plurality of magnetic elements having a radially inner periphery having a first diameter. The bearing including a first member having a radially outer periphery wherein a diameter of the radially outer periphery is substantially equal to the first diameter, and a radially inner second member in rotatable engagement with the first member, the first member and the second member configured to transmit loads from the rotor to a stator such that a substantially uniform airgap between the rotor and the stator is maintained.

DETAILED DESCRIPTION OF THE INVENTION

Figure 1:
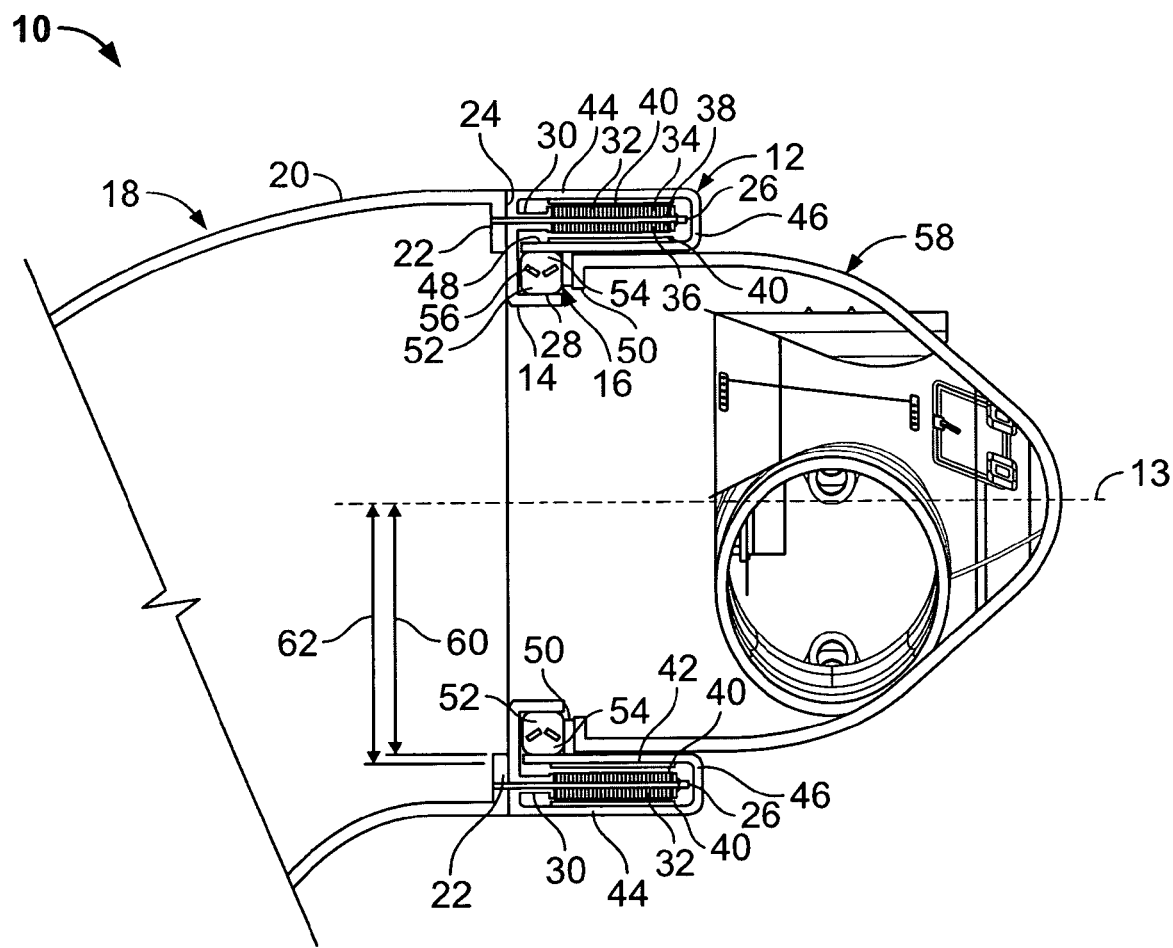
FIG. 1 is a schematic elevation illustration of an exemplary wind turbine generator that includes a rotor, a stator, and a bearing.

FIG. 1 is a schematic elevation illustration of an exemplary wind turbine generator 10 that includes a rotor 12, a stator 14 and a bearing 16. In the exemplary embodiment, a base 18 couples to a tower (not shown). Base 18 includes a body 20 and a base flange 22. Stator 14 is configured to couple to base flange 22 through face to face engagement of base flange 22 and a complementary stator flange 24. In the exemplary embodiment, stator 14 is fastened to mating flange 22 through a plurality of bolts 26 spaced circumferentially about a longitudinal axis 13 of generator 10. In an alternative embodiment, stator 14 is fastened to base flange 22 using weldment and/or other fasteners. Stator 14 includes a radially inner bearing support 28 extending axially from stator flange 24. Stator 14 also includes a core mount rim 30 that extends axially from stator flange 24. In the exemplary embodiment, a stator core 32 is coupled to core mount rim 30 using bolts 26. Stator core 32 includes at least one winding 34 that is used to generate an electrical output of wind turbine generator 10. In the exemplary embodiment, stator core 32 and winding 34 are illustrated as a double-sided stator. Stator core 32 and winding 34 include a radially inner portion 36 and a radially outer portion 38, each portion may be separately excited from magnetic elements 40 coupled to rotor 12.

In the exemplary embodiment, rotor 12 is illustrated as a double-sided rotor wherein rotor 12 includes at least one magnetic element 40 spaced circumferentially about an outer periphery of a radially inner rotor rim 42 and at least one magnetic element 40 spaced circumferentially about an inner periphery of a radially outer rotor rim 44. Rotor rims 42 and 44 extend axially in parallel with stator core 32. An air gap is defined between portion 36 and magnetic elements 40 coupled to rim 42, and between portion 38 and magnetic elements 40 coupled to rim 44. Uniformity of the air gaps is desirous because the magnetic field generated by magnet elements 40 traverse the air gap to interact with stator windings 34 to generate a voltage in stator windings 34. Rotor rims 42 and 44 may be coupled together at a distal end by a rotor flange 46 that extends radially from radially inner rotor rim 42 to radially outer rotor rim 44.

Bearing 16 extends circumferentially about bearing support 28 and couples to rotor 12 through at least one bearing support flange 48 that extends axially from inner rim 42. A second flange 50 may extend radially inward from inner rim 42 such that a bearing compartment 51 is defined by stator flange 24, bearing support 28, support flange 48, and second flange 50. In the exemplary embodiment, bearing 16 includes an inner race 52, an outer race 54, and rolling elements 56. A hub 58 may couple to second flange 50. Hub 58 couples to at least one blade (not shown) and transmits loads generated by and/or induced into the blades to rotor 12. Loads transmitted to rotor 12 are transmitted directly to bearing 16 through a relatively short load path. Loads expressed onto rotor 12 have a relatively small amount of structure over which to act such that deformation of the rotor structure is minimal. The load transmission path through rotor 12 is small due to the close coupling of hub 58, bearing support flange 48, bearing 16, and stator 14. A radial distance 60 between longitudinal axis 13 and an outer periphery of outer race 54 is substantially equal to a radial distance 62 between longitudinal axis 13 and an inner periphery of magnetic elements 40. With radial distances 60 and 62 substantially equal, the load path for transmitting loads from hub 58 through rotor 12 is structurally short wherein large loads may be accommodated by rotor 12 without generating large bending moments within rotor 12. Such bending moments are proportional to the load applied and a distance over which the loads are applied. A rotor that facilitates reducing the load path through the rotor also reduces the bending moment applied to the rotor structure such that the air gap between radially inner portion 36 and magnetic elements 40 is facilitated being maintained substantially uniform.

Figure 2:
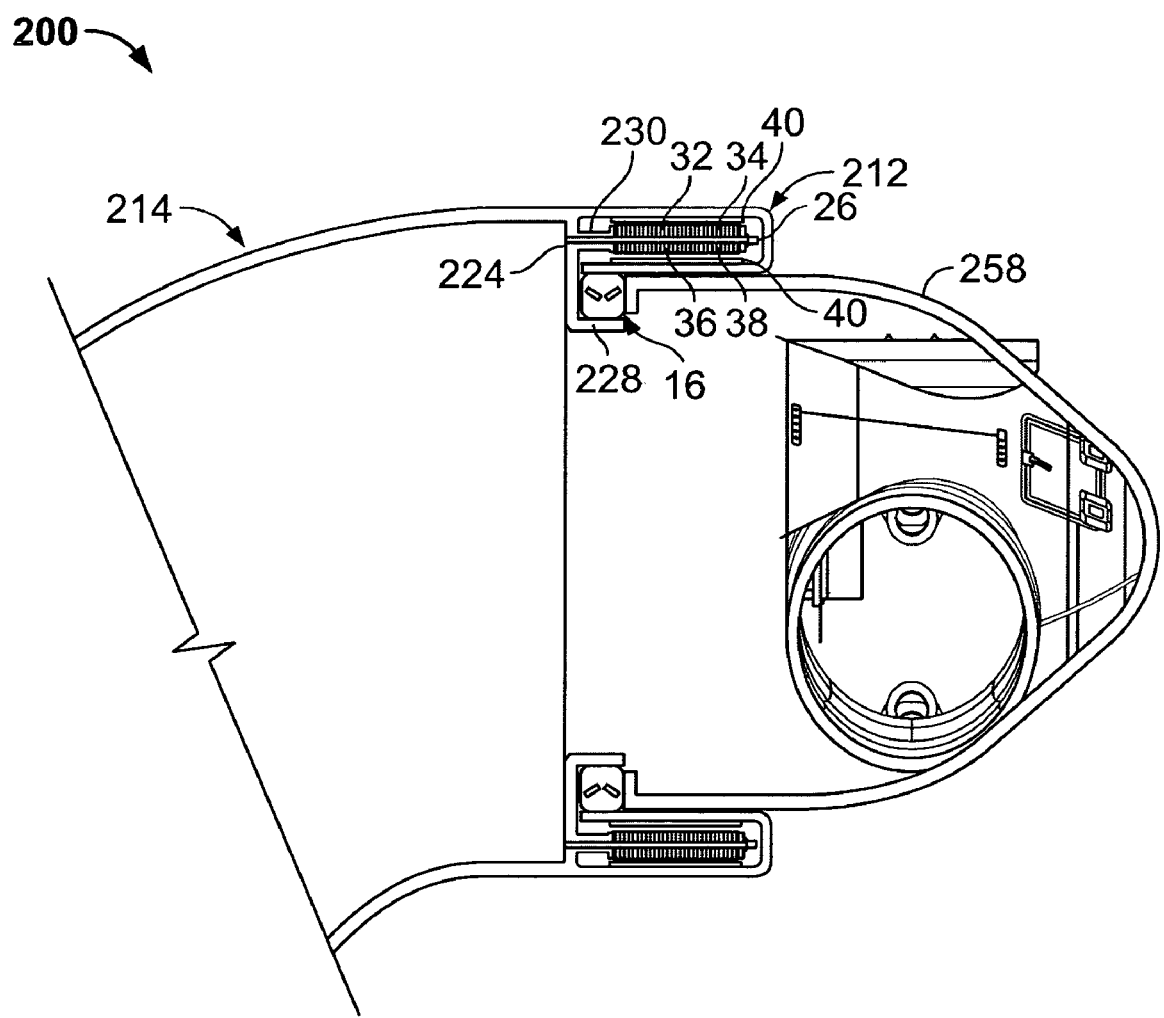
FIG. 2 is a schematic elevation illustration of an exemplary wind turbine generator that includes an integral stator flange and integral rotor hub.

FIG. 2 is a schematic elevation illustration of another exemplary wind turbine generator 200. Wind turbine generator 200 is substantially similar to wind turbine generator 10, (shown in FIG. 1) and components of wind turbine generator 200 that are identical to components of wind turbine generator 10 are identified in FIG. 2 using the same reference numerals used in FIG. 1. An exemplary embodiment of wind turbine generator 200 includes a rotor 212, a stator 214 and a bearing 16. Stator 214 generally includes base 18 including body 20 and base flange 22 (shown in FIG. 1) unitarily formed with stator 14. Stator 214 includes a radially inner bearing support 228 extending axially from a stator flange 224. Stator 214 also includes a core mount rim 230 that extends axially from stator flange 224. In the exemplary embodiment, a stator core 32 is coupled to core mount rim 230 using bolts 26. Stator core 32 includes at least one winding 34 that is used to generate an electrical output of wind turbine generator 200. In the exemplary embodiment, stator core 32 and winding 34 are illustrated as a double-sided stator. Stator core 32 and winding 34 include a radially inner portion 36 and a radially outer portion 38, each portion may be separately excited from magnetic elements 40 coupled to rotor 212. In an alternative embodiment, stator core 32 and winding 34 are single-sided wherein stator core 32 and winding 34 include only radially inner portion 36 or radially outer portion 38.

In the exemplary embodiment, rotor 212 is illustrated as a double-sided rotor wherein rotor 12 includes at least one magnetic element 40 spaced circumferentially about an outer periphery of a radially inner rotor rim 42 and at least one magnetic element 40 spaced circumferentially about an inner periphery of a radially outer rotor rim 44. In an alternative embodiment, rotor 12 is a single-sided rotor wherein rotor rims 42 and 44 extend axially in parallel with stator core 32. In the exemplary embodiment, rotor 212 includes an integrally formed hub portion 258 that couples to at least one blade (not shown) and transmits loads generated by and/or induced into the blades to rotor 212. Loads transmitted to rotor 212 are transmitted directly to bearing 16 through a relatively short load path. Loads expressed onto rotor 212 have a relatively small amount of structure over which to act such that deformation of the rotor structure is minimal. The load transmission path through rotor 212 is small due to the close coupling of hub portion 258, rotor 212, bearing 16, and stator 214.

Figure 3:
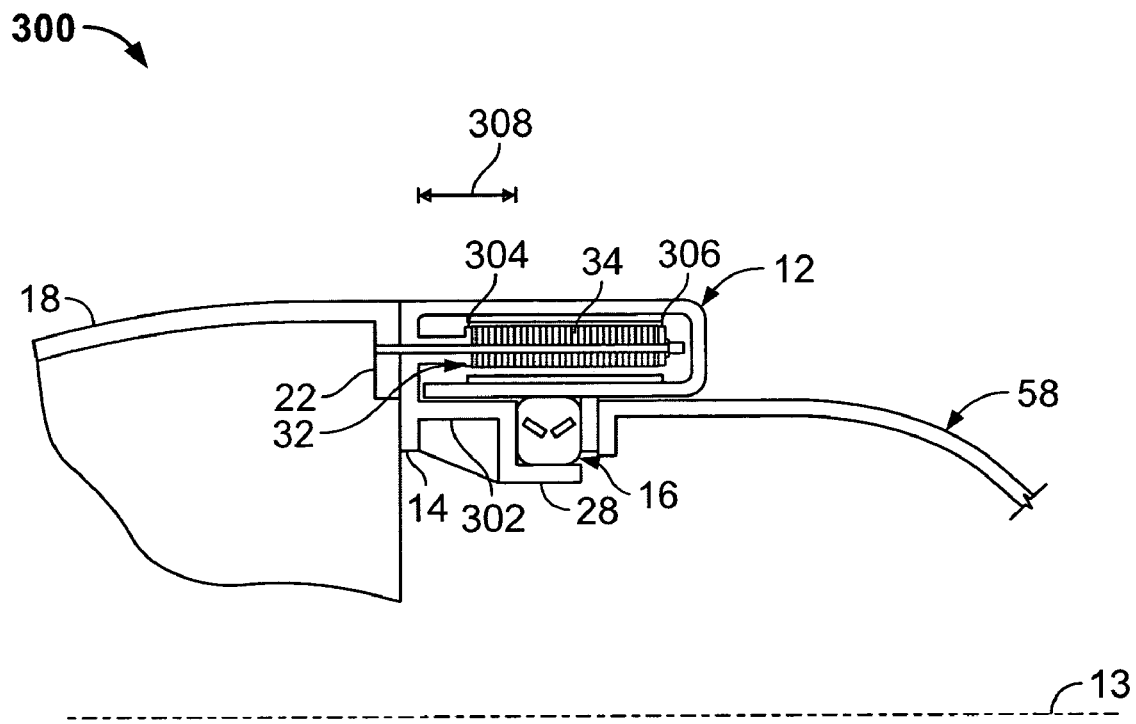
FIG. 3 is a schematic elevation illustration of an exemplary wind turbine generator that includes a bearing positioned radially inside the generator stator core.

FIG. 3 is a schematic elevation illustration of a portion of another exemplary wind turbine generator 300. Wind turbine generator 300 is substantially similar to wind turbine generator 10, (shown in FIG. 1) and components of wind turbine generator 300 that are identical to components of wind turbine generator 10 are identified in FIG. 3 using the same reference numerals used in FIG. 1. In the exemplary embodiment, wind turbine generator 300 is illustrated with a separate base 18 that is separate from stator 14, and a hub 58 that is separate from rotor 12, similar to the configuration shown in FIG. 1. It should be understood that wind turbine generator 300 may be configured with base 18 unitarily formed with stator 14, and/or hub 58 unitarily formed with rotor 12, similar to the configuration shown in FIG. 2. Wind turbine generator 300 includes stator core 32 and winding 34 coupled to core mount rim 30. In the exemplary embodiment, stator core 32 and winding 34 are a double-sided stator core 32 and winding 34. In an alternative embodiment, stator core 32 and winding 34 is a single-sided stator core 32 and winding 34. Stator 14 is coupled to base flange 22. Bearing support 28 includes an axial extension 302 that permits bearing 16 to be positioned at a location at is axially between a mounting end 304 and a distal end 306 of stator core 32. A length 308 of extension 302 may be predetermined based on a determined load path between hub 58 and base 18.

Figure 4:
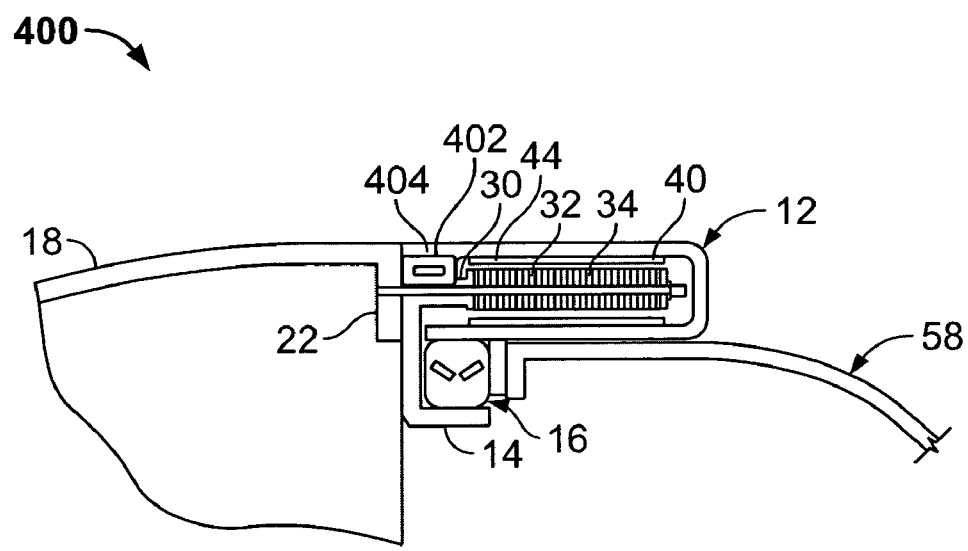
FIG. 4 is a schematic elevation illustration of an exemplary wind turbine generator that includes a second bearing between the generator stator and a distal end of the rotor outer rim.

FIG. 4 is a schematic elevation illustration of a portion of another exemplary wind turbine generator 400. Wind turbine generator 400 is substantially similar to wind turbine generator 10, (shown in FIG. 1) and components of wind turbine generator 400 that are identical to components of wind turbine generator 10 are identified in FIG. 4 using the same reference numerals used in FIG. 1. In the exemplary embodiment, wind turbine generator 400 is illustrated with a separate base 18 that is separate from stator 14, and a hub 58 that is separate, from rotor 12, similar to the configuration shown in FIG. 1. It should be understood that wind turbine generator 400 may be configured with base 18 unitarily formed with stator 14, and/or hub 58 unitarily formed with rotor 12, similar to the configuration shown in FIG. 2. Wind turbine generator 400 includes stator core 32 and winding 34 coupled to core mount rim 30. In the exemplary embodiment, stator core 32 and winding 34 are a double-sided stator core 32 and winding 34. Wind turbine generator 400 includes a second radially outer bearing 402 that is mounted to core mount rim 30 and coupled to a distal end 404 of outer rotor rim 44. In the exemplary embodiment, bearing 16 carries substantially all the load that is transmitted from hub 58 to base 18. Bearing 402 transmits loads from outer rotor rim 44 to stator flange 24 such that distal end 404 is facilitated being stabilized, for example oscillations of outer rotor rim 44 may be reduced and variations in the airgap between magnetic elements 40 and stator core 32 also may be reduced.

Figure 5:
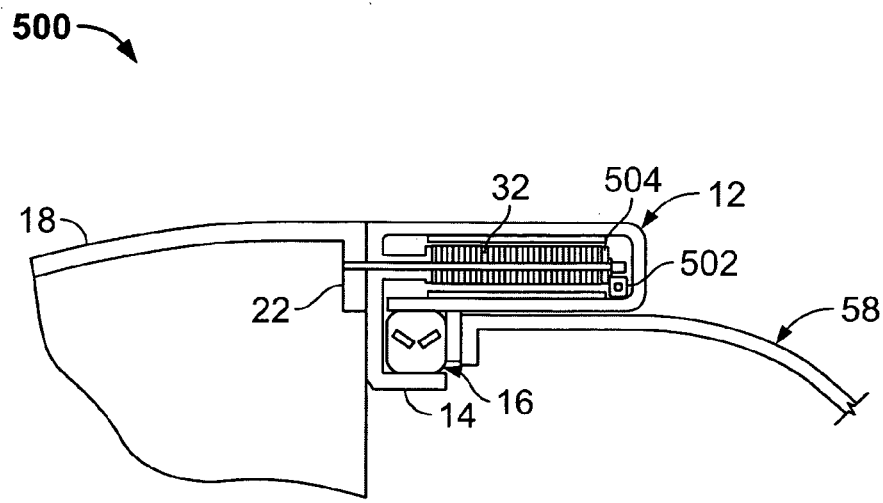
FIG. 5 is a schematic elevation illustration of an exemplary wind turbine generator that includes a second bearing between a distal end of the generator stator core the rotor rim.

FIG. 5 is a schematic elevation illustration of a portion of another exemplary wind turbine generator 500. Wind turbine generator 500 is substantially similar to wind turbine generator 10, (shown in FIG. 1) and components of wind turbine generator 500 that are identical to components of wind turbine generator 10 are identified in FIG. 5 using the same reference numerals used in FIG. 1. In the exemplary embodiment, wind turbine generator 500 is illustrated with a separate base 18 that is separate from stator 14, and a hub 58 that is separate from rotor 12, similar to the configuration shown in FIG. 1. It should be understood that wind turbine generator 500 may be configured with base 18 unitarily formed with stator 14, and/or hub 58 unitarily formed with rotor 12, similar to the configuration shown in FIG. 2. In the exemplary embodiment, rotor 12 is illustrated as a double-sided rotor wherein rotor 12 includes at least one magnetic element 40 spaced circumferentially about an outer periphery of a radially inner rotor rim 42 and at least one magnetic element 40 spaced circumferentially about an inner periphery of a radially outer rotor rim 44. In an alternative embodiment, rotor 12 is a single-sided rotor wherein rotor rims 42 and 44 extend axially in parallel with stator core 32. Wind turbine generator 500 includes a second bearing 502 that is positioned adjacent a distal end 504 of stator core 32. In the exemplary embodiment, bearing 16 carries substantially all the load that is transmitted from hub 58 to base 18. Second bearing 502 at distal end 504 transmits loads, for example oscillatory loads induced into cantilevered stator core 32, from distal end 504 to inner rotor rim 44 such that distal end 504 is facilitated being stabilized, for example oscillations of stator core 32 may be reduced and variations in the airgap between magnetic elements 40 and stator core 32 also may be reduced.

Figure 6:
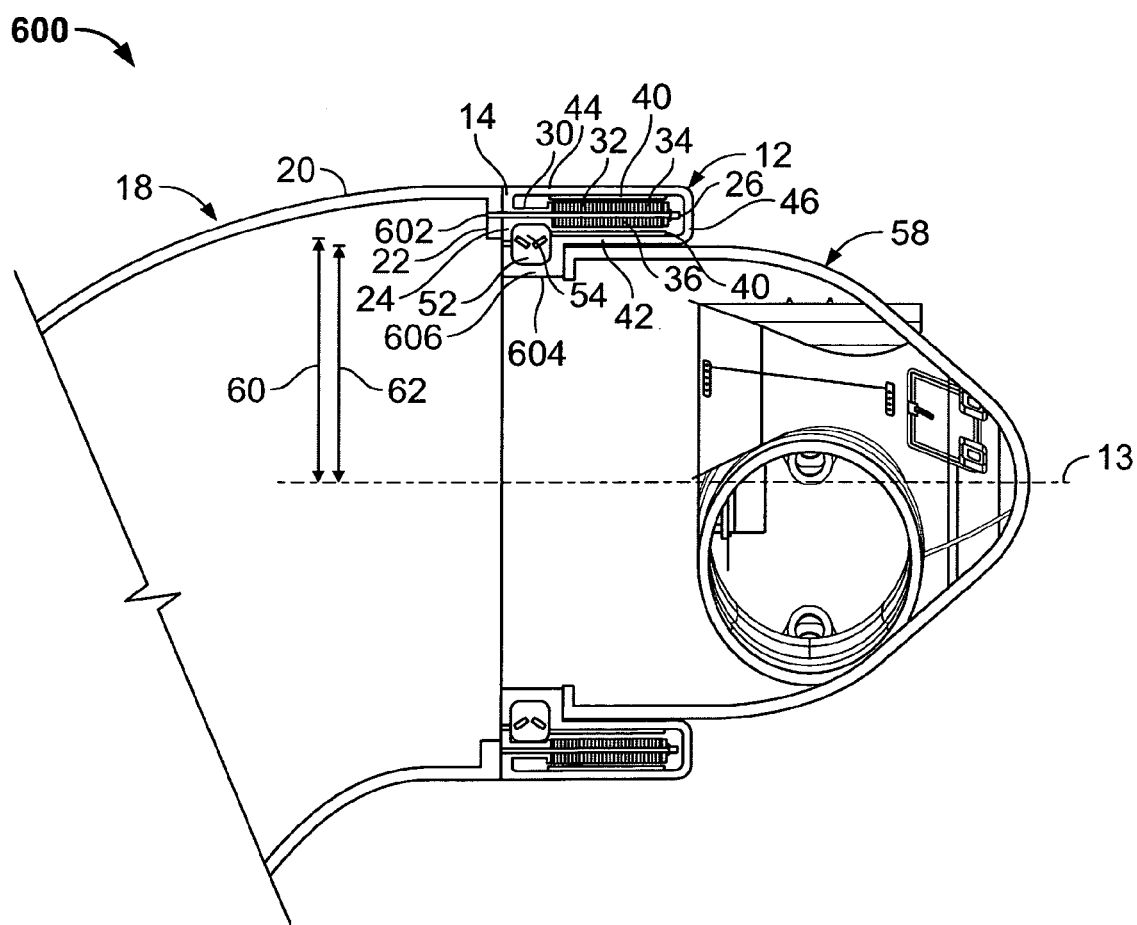
FIG. 6 is a schematic elevation illustration of an exemplary wind turbine generator that includes a bearing positioned between a core mount rim and the rotor.

FIG. 6 is a schematic elevation illustration of another exemplary wind turbine generator 600. Wind turbine generator 600 is substantially similar to wind turbine generator 10, (shown in FIG. 1) and components of wind turbine generator 600 that are identical to components of wind turbine generator 10 are identified in FIG. 6 using the same reference numerals used in FIG. 1. Base 18 includes a body 20 and a base flange 22. Stator 14 is configured to couple to base flange 22 through face to face engagement of base flange 22 and a complementary stator flange 24. In the exemplary embodiment, stator 14 is fastened to mating flange 22 through a plurality of bolts 26 spaced circumferentially about a longitudinal axis 13 of wind turbine generator 600. In an alternative embodiment, stator 14 is fastened to base flange 22 using weldment and/or other fasteners. Stator 14 includes a core mount rim 30 that extends axially from stator flange 24. In the exemplary embodiment, a stator core 32 is coupled to core mount rim 30 using bolts 26. Stator core 32 includes at least one winding 34 that is used to generate an electrical output of wind turbine generator 600. In the exemplary embodiment, stator core 32 and winding 34 are illustrated as a double-sided stator. Stator core 32 and winding 34 include a radially inner portion 36 and a radially outer portion 38, each portion may be separately excited from magnetic elements 40 coupled to rotor 12. In the exemplary embodiment, a radially inner portion 602 of core mount rim 30 is configured to receive radially outer race 54 of bearing 16. Radially inner race 52 of bearing 16 is coupled to a rotor bearing support 604 that extends from inner rotor rim 42.

In the exemplary embodiment, rotor 12 is illustrated as a double-sided rotor wherein rotor 12 includes at least one magnetic element 40 spaced circumferentially about an outer periphery of radially inner rotor rim 42 and at least one magnetic element 40 spaced circumferentially about an inner periphery of radially outer rotor rim 44. Rotor rims 42 and 44 extend axially in parallel with stator core 32. An air gap is defined between portion 36 and magnetic elements 40 coupled to rim 42, and between portion 38 and magnetic elements 40 coupled to rim 44. Uniformity of the air gaps is desirous because the magnetic field generated by magnet elements 40 traverse the air gap to interact with stator windings 34 to generate a voltage in stator windings 34. Rotor rims 42 and 44 may be coupled together at a distal end by a rotor flange 46 that extends radially from radially inner rotor rim 42 to radially outer rotor rim 44.

Bearing 16 extends circumferentially about bearing support 602 and couples to stator 14 through radially inner portion 600 of core mount rim 30 Bearing support 604 and radially inner portion 602 of core mount rim 30 each cooperate to define a bearing compartment 606 therebetween. In the exemplary embodiment, bearing 16 includes an inner race 52, an outer race 54, and rolling elements 56. In the exemplary embodiment, a hub 58 is coupled to rotor bearing support 604. In an alternative embodiment, hub 58 is integrally formed with rotor 12. Hub 58 couples to at least one blade (not shown) and transmits loads generated by and/or induced into the blades to rotor 12. Loads transmitted to rotor 12 are transmitted directly to bearing 16 through a relatively short load path. Loads expressed onto rotor 12 have a relatively small amount of structure over which to act such that deformation due to flexure of the rotor structure is facilitated being minimized. The load transmission path through rotor 12 is small due to the close coupling of hub 58, bearing support flange 604, bearing 16, and stator 14. A radial distance 60 between longitudinal axis 13 and an outer periphery of outer race 54 is substantially equal to a radial distance 62 between longitudinal axis 13 and an inner periphery of magnetic elements 40. With radial distances 60 and 62 substantially equal, the load path for transmitting loads from hub 58 through rotor 12 is structurally short wherein large loads may be accommodated by rotor 12 without generating large bending moments within rotor 12. Such bending moments are proportional to the load applied and a distance over which the loads are applied. Rotor 12 facilitates reducing the load path through rotor 12 such that bending moments applied to rotor 12 are reduced and the air gap between radially inner portion 36 and magnetic elements 40 is facilitated being maintained substantially uniform.

The above-described wind turbine generator provides a cost-effective and reliable means for transmitting loads from a wind turbine generator rotor to a wind turbine generator base. More specifically, a bearing with a diameter that is substantially similar to a diameter of the rotor magnetic elements facilitates minimizing the load path from the wind turbine generator rotor to the wind turbine generator stator. Therefore, the loads act over a relatively shorter distance and develop lesser forces that may deform the rotor, which facilitates maintaining a uniform air gap between the stator and the rotor in a cost-effective and highly reliable manner.

An exemplary embodiment of a wind turbine generator system is described above in detail. The generator components illustrated are not limited to the specific embodiments described herein, but rather, components of each may be utilized independently and separately from other components described herein.

While the invention has been described in terms of various specific embodiments, those skilled in the art will recognize that the invention can be practiced with modification within the spirit and scope of the claims.

What is claimed is:

1. A wind turbine generator comprising:
   a stator comprising a core and a plurality of stator windings extending axially away from said stator, said core and plurality of stator windings circumferentially spaced about a generator longitudinal axis;
   a rotor, positioned radially inwardly from said stator, rotatable about the generator longitudinal axis, said rotor comprising a plurality of magnetic elements coupled to a radially outer periphery of said rotor such that an airgap is defined between said stator windings and said magnetic elements, said a plurality of magnetic elements comprising a radially inner periphery having a first diameter; and
   a single bearing comprising a first member in rotatable engagement with a radially inner second member, said first member comprising a radially outer periphery, a diameter of the radially outer periphery of the first member being substantially equal to the first diameter to maintain a structurally short load path for transmitting loads such that relatively large loads may be accommodated without generating large bending moments, said rotor coupled to said stator through said single bearing such that a substantially uniform airgap is maintained.

2. A wind turbine generator in accordance with claim 1 wherein said rotor is directly driven by at least one blade.

3. A wind turbine generator in accordance with claim 1 wherein said stator comprises at least one of a single-sided core and a double-sided core.

4. A wind turbine generator in accordance with claim 3 wherein said core includes a distal end that extends axially away from said stator.

5. A wind turbine generator in accordance with claim 4 further comprising a second bearing coupled between a distal end of said stator core and said rotor.

6. A wind turbine generator in accordance with claim 1 wherein said stator is coupled to a flange of a generator base member.

7. A wind turbine generator in accordance with claim 1 wherein said stator is a unitary portion of a generator base member.

8. A wind turbine generator in accordance with claim 1 further comprising at least one blade coupled to a hub wherein said rotor is a unitary portion of said hub.

9. A wind turbine generator in accordance with claim 1 wherein said rotor comprises a second plurality of magnetic elements coupled to an inner periphery of an outer rotor member.

10. A wind turbine generator in accordance with claim 9 further comprising a second bearing coupled between said stator and said outer rotor member.

11. A wind turbine generator in accordance with claim 1 wherein said bearing is positioned radially inward from and axially aligned with said stator.

12. A wind turbine generator in accordance with claim 1 wherein said bearing is positioned radially inward from and substantially axially aligned with a midpoint of said stator core.

13. A single bearing for a wind turbine generator, said wind turbine generator comprising a stator having a core and a plurality of stator windings extending axially away from said stator, and a rotor positioned radially inwardly from said stator, said rotor having a plurality of magnetic elements circumferentially spaced about the rotor, said plurality of magnetic elements comprising a radially inner periphery having a first diameter; said
   single bearing comprising:
   a first member coupled to said rotor, said first member comprising a radially outer periphery, a diameter of the radially outer periphery of said first member being substantially equal to the first diameter; and
   a radially inner second member in rotatable engagement with said first member, said first member and said second member configured to transmit loads from the rotor to a stator such that a substantially uniform airgap between said rotor and said stator is maintained.

14. A bearing in accordance with claim 13 wherein said rotor is directly driven by at least one blade.

15. A bearing in accordance with claim 13 wherein said stator comprises at least one of a single-sided core and a double-sided core.

16. A bearing in accordance with claim 15 wherein said core includes a distal end that extends axially away from said stator.

17. A bearing in accordance with claim 13 that is configured to couple to a stator flange and a bearing support extending axially from said flange.

18. A bearing in accordance with claim 13 further comprising at least one blade coupled to a hub wherein said rotor is a unitary portion of said hub.

19. A bearing in accordance with claim 13 wherein said rotor comprises a second plurality of magnetic elements coupled to an inner periphery of an outer rotor member.

20. A bearing in accordance with claim 13 wherein said bearing is positioned radially inward from and axially aligned with said stator.

21. A bearing in accordance with claim 13 wherein said bearing is positioned radially inward from and substantially axially aligned with a midpoint of said stator core.

22. A method of assembling a wind turbine generator, said method comprising:
coupling a stator core to a stator such that the stator core extends axially from the stator, the stator core being spaced circumferentially about a longitudinal axis of the generator;
coupling one of a radially inner bearing member and a radially outer bearing member of a single bearing to the stator; and
coupling a rotor to the other one of the radially inner member and radially outer member of the single bearing, the rotor rotatable about the generator longitudinal axis, the rotor including a plurality of magnetic elements coupled to a radially outer periphery of the rotor such that an airgap is defined between the stator core and the magnetic elements, the plurality of magnetic elements comprising a radially inner periphery having a first diameter, a diameter of the radially outer periphery of the outer member being substantially equal to the first diameter to maintain a structurally short load path for transmitting loads such that relatively large loads may be accommodated without generating large bending moments, the rotor coupled to the stator through the single bearing such that a substantially uniform airgap is maintained.

23. A method in accordance with claim 22 wherein coupling a stator core to a stator comprises coupling at least one of a single-sided core and a double-sided core to the stator.

24. A method in accordance with claim 22 wherein coupling a stator core to a stator comprises coupling a stator core that includes a distal end that extends axially away from the stator.

25. A method in accordance with claim 22 further comprising coupling the stator to a flange of a generator base member.

26. A method in accordance with claim 22 wherein coupling a stator core to a stator comprises coupling the stator core to a flange that is a unitary portion of a base member of the wind turbine generator.

27. A method in accordance with claim 22 further comprising coupling a hub to a flange of the rotor.

28. A method in accordance with claim 22 wherein coupling a rotor to the other one of the radially inner member and radially outer member of the bearing comprises coupling a rotor that is a unitary portion of a hub to the other one of the radially inner member and radially outer member.

29. A method in accordance with claim 22 wherein the rotor includes a radially outer rim extending circumferentially about the stator core, the outer rim including a second plurality of magnetic elements coupled to an inner periphery of the radially outer member, said method comprising coupling the rotor to the bearing such that the rotor is rotatable within the stator core and the outer rim is simultaneously rotatable outside the stator core.

30. A method in accordance with claim 22 wherein coupling a rotor to the bearing comprises coupling the rotor to the bearing positioned radially inward from and axially aligned with the stator.

31. A method in accordance with claim 22 wherein coupling a rotor to the bearing comprises coupling the rotor to the bearing positioned radially inward from and axially aligned with the stator core.

32. A method in accordance with claim 22 wherein coupling a rotor to the bearing comprises coupling the rotor to the bearing positioned radially inward from and axially aligned with a midpoint of the stator core.

* * * * *